(No Model.) 2 Sheets—Sheet 1.
N. BRADLEY.
APPARATUS FOR PREPARING YEAST FOR USE IN BREWING.
No. 391,775. Patented Oct. 30, 1888.
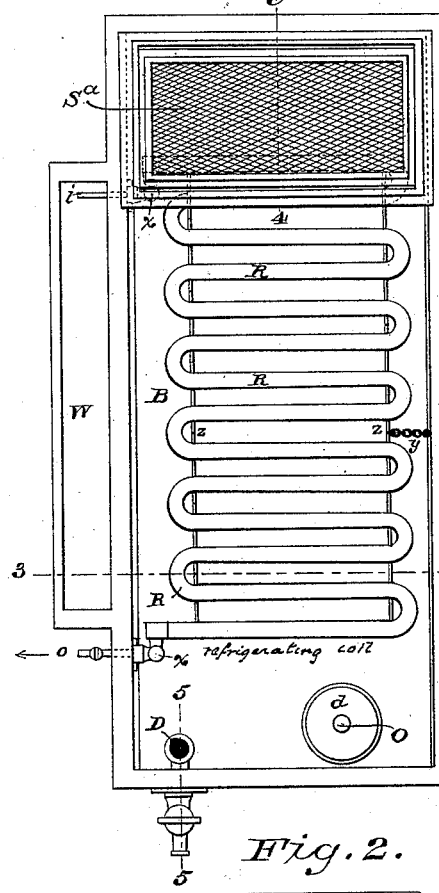
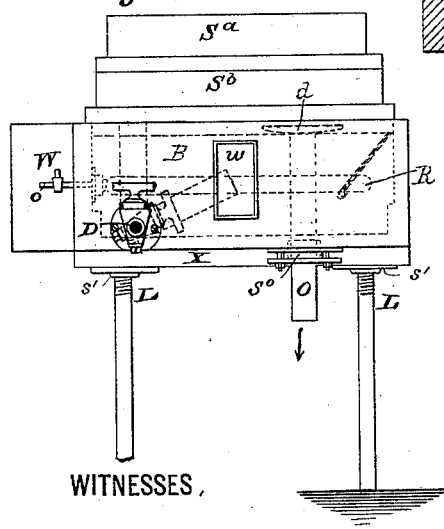
WITNESSES,
Ed. A. Newman.
Al. C. Newman.
INVENTOR,
Nathaniel Bradley.
By his Attorney
Jas. L. Ewin.

(No Model.) 2 Sheets—Sheet 2.
N. BRADLEY.
APPARATUS FOR PREPARING YEAST FOR USE IN BREWING.
No. 391,775. Patented Oct. 30, 1888.
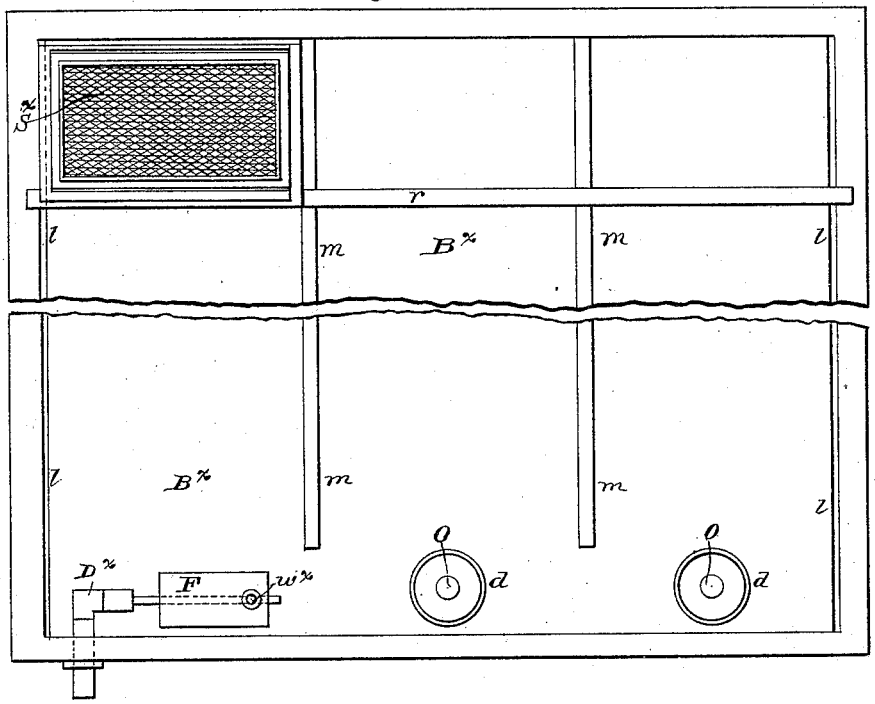
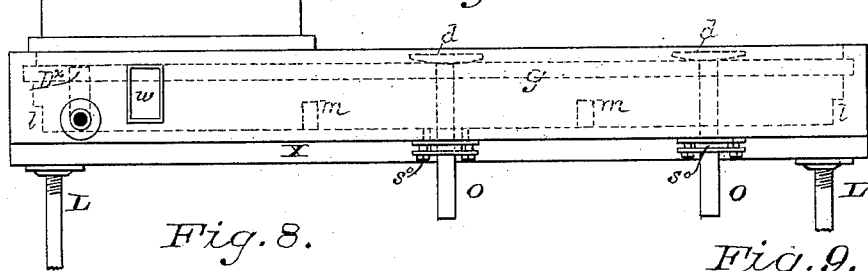
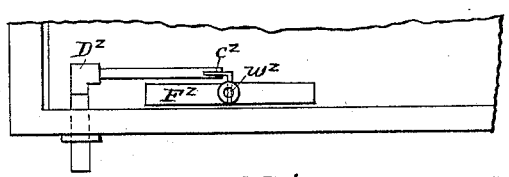
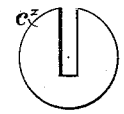
WITNESSES,  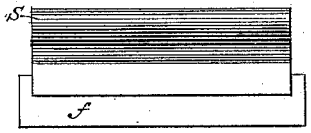 INVENTOR.
Ed. A. Newman,
Al. C. Newman,
By his Attorney  Nathaniel Bradley.

UNITED STATES PATENT OFFICE.

NATHANIEL BRADLEY, OF MANCHESTER, COUNTY OF LANCASTER, ENGLAND.

APPARATUS FOR PREPARING YEAST FOR USE IN BREWING.

SPECIFICATION forming part of Letters Patent No. 391,775, dated October 30, 1888.

Application filed October 9, 1884. Serial No. 145,083. (No model.) Patented in England December 19, 1883, No. 5,805.

*To all whom it may concern:*

Be it known that I, NATHANIEL BRADLEY, a subject of the Queen of Great Britain and Ireland, residing at Manchester, in the county of Lancaster, England, have invented certain new and useful Improvements in Apparatus for Preparing Yeast for Use in Brewing, and for other Purposes, (patented in Great Britain and Ireland by Letters Patent numbered 5,805, and dated December 19, 1883,) of which the following is a specification.

This invention consists in a novel combination of parts, hereinafter set forth and claimed, in apparatus designed as a whole for so treating "yeast"—that is to say, ordinary brewers' barm (*Saccharomyces cerevisiæ*)—as to separate and preserve the sound and useful portions thereof free from all hurtful ferments, minute cells or "small yeast," and objectionable foreign matter, which are injurious to beer and are often associated with beer-yeast.

Two sheets of drawings accompany this specification as part thereof.

Figure 1 of the drawings, on Sheet 1, is a top view of the principal apparatus, hereinafter termed the "barm-cleanser," in a preferred form. Fig. 2 is an end elevation thereof. Fig. 3 represents a vertical transverse section on the line 3 3, Fig. 1; and Figs. 4 and 5 represent magnified vertical sections on the lines 4 4 and 5 5, Fig. 1, respectively. Fig. 6, Sheet 2, is a small-scale top view of the two ends of a larger barm-cleanser constructed and operating in part on the same principle, and designed, primarily, to supplement the former. Fig. 7 is an end elevation of the same. Fig. 8 is a fragmentary top view thereof, showing another style of discharge-float. Fig. 9 is a magnified end view of an escape-regulating cap for the discharge-pipe shown in Fig. 8, and Figs. 10 and 10× are end and side views of a "barm-squeegee" of a form used in connection with said barm-cleansers.

Like letters of reference indicate corresponding parts in the several figures.

In carrying my invention into effect pressed barm, or unpressed barm if not liquid enough, is first well mixed with cold pure water or pure wort, or any cold liquid suitable for mixing with or for washing yeast, so that each gallon of the mixture shall contain about twenty-four ounces of pressed barm or about forty-eight ounces of unpressed barm.

From the mixer, which forms no part of my present invention, the barm is poured or run through a sieve or sieves into the barm-chamber B of the first barm-cleanser. Preferably a pair of sieves, $S^a$ $S^b$, are employed, and the barm-cleanser itself is provided therewith, as shown in Figs. 1 to 4, inclusive. The upper sieve, $S^a$, may be clothed with wire-gauze, of copper, and should have about three thousand six hundred meshes to the square inch. Its office is to protect the lower sieve, $S^b$, by keeping back bits of grit or metal and such refuse as would tear or injure a cloth sieve. The lower sieve is preferably clothed with that kind of silk known as "bolting-cloth," having not less than fifteen thousand six hundred and twenty-five meshes to the square inch. This lower sieve catches and holds back any slimy or gelatinous particles of matter, insects, and dust, and the objectionable matter thus separated is emptied from the sieve during the succeeding part of the process.

To cause the barm which has been deposited on the silk of the lower sieve, $S^b$, to pass through when it is not sufficiently fluid to do so readily, a scraper or "squeegee," S, Figs. 10, and 10×, having a flexible face strip, $f$, of gutta-percha or other suitable material, may be occasionally used, the lower sieve having been exposed by removing the upper sieve, or by withdrawing the lower sieve, if the latter be in the form of a drawer, as it may be preferably. In said barm-cleanser (represented by Figs. 1 to 5, inclusive) the upper sieve, $S^a$, is removable vertically to provide for exposing the lower sieve, $S^b$, each having a wooden curb supported at its ends, that of the former on the end walls of the lower sieve. Said barm-chamber B of this barm-cleanser is of sufficient horizontal area to accommodate a given quantity of the barm-liquid with the depth of the latter at the beginning of its treatment therein about six inches. The liquid containing the barm-cells, now thoroughly washed and divided, falls through the sieves $S^a$ $S^b$ into this chamber, and is accumulated therein until about six inches deep, as aforesaid.

For precipitating the sound and useful portions of the washed barm and bringing its impurities to the surface, cooling the liquid from the surface downward is relied on, and in said barm-cleanser (shown in Figs. 1 to 5, inclusive) this is accomplished in a preferred way by means of a metallic refrigerating-coil, R, in connection with a water-chamber, W, an inlet-pipe, $i$, connecting this water-chamber with one end of the coil, and an outlet-pipe, $o$, communicating with the other end of the coil and provided with a stop-cock, as clearly shown in Fig. 1. The respective ends of the coil are connected with said inlet and outlet pipes by water-tight knuckle-joints or hinges $x\,x$, which preserve unobstructed passage-ways therethrough, while they permit the coil to be adjusted vertically at the opposite edge by means of a supporting-chain, $y$, linked up more or less, or to be turned up, as shown in Fig. 3, so as to leave the barm-chamber unobstructed. Brace-rods $z\,z$, with one of which said chain connects, stiffen the coil in the customary way. The water-chamber W is supplied with water from a hose or faucet, and if need be with ice, and the cold water is passed through the coil R more or less rapidly, as may be required, under the control of the stop-cock in the outlet-pipe $o$.

The temperature of the barm-liquid is best when kept below 50° Fahrenheit; but ordinary brewers' barm may be purified sufficiently for "pitching" without ice if cold well-water can be obtained for the refrigerating-coil. At from 40° to 48° Fahrenheit the pure barm-globules subside most quickly, while the minute cells, bacteria, and vibrios, hurtful ferments, being of less specific gravity, float for a time in the liquid above the precipitating barm.

In a vertical slot in one of the walls of the barm-cleanser there is inserted a narrow piece of glass, forming a water-tight window, $w$, Fig. 2, through which the height of the subsiding barm may be seen, and adjacent thereto is a discharging device, D, Figs. 1, 2, and 5, by means of which at the proper time the supernatant liquid containing said objectionable matter may be run off. This device, as here shown, consists of a pipe of L shape, the horizontal member of which extends through a water-tight gland in said wall of the barm-cleanser, immediately above the bottom of its said chamber B, and terminates at its outer end in a faucet, by which the normally-vertical member of the pipe within the barm-chamber may be inclined more or less, as represented by dotted lines in Fig. 2, so that its open extremity may be made to follow the subsiding surface of the liquid downward and carry off the upper scum before the surface sinks to that of the deposited barm. Located as shown in Fig. 2, the inner arm of the discharge-pipe swings past the window $w$, as indicated, and its position may thus be watched. The two members of the discharge-pipe, as shown in Fig. 5, are furthermore separable, so that by unscrewing them from each other the outer one may be used alone in drawing the lower strata of liquid containing the useful barm into another cleanser, or may itself be withdrawn, so as to facilitate thoroughly cleansing the apparatus. In addition to said discharging device D, at least one outlet, O, opening directly through the bottom of the barm-chamber, is considered necessary for quickly running off the scum and refuse surface liquid, which contains the bacteria and other objectionable matter, as aforesaid. Said outlet O, as shown, is a vertical tube sliding through a water-tight stuffing-box, $S^o$, (seen in Fig. 2,) and provided at its upper end with a removable scum-collecting dish, $d$, connected therewith by a central collar. This dish is kept above the surface of the liquid until the scum is ready to be run off, when it is pushed down by hand to the necessary depth in the liquid. Freed from the dish $d$, the tube O may be drawn down, so as to aid in drawing off the lower strata of liquid containing the useful barm, or it may be used to carry off sweepings or washings, or wholly withdrawn at will.

Supporting-legs L L, Fig. 2, in sufficient number, united by screw-couplings $s'$ with cross-beams X, provided for adjusting the cleanser so that the bottom of the barm-chamber shall be perfectly horizontal, or slightly inclined, as may be required, and horizontal ledges $l\,l$ within the barm-chamber along its side walls, afford supports and guides for skimmers or squeegees, so that they may be applied to the surface of the liquid or deposited barm with uniformity. From said barm cleanser the partially-purified barm-liquid will usually be drawn off into one or more shallow supplemental cleansers, such as the one shown in Figs. 6 and 7, Sheet 2. This has a sifting device, $S^x$, which may, but need not, be identical with the pair of sieves $S^a\,S^b$, Sheet 1. As shown, it consists of a single sieve in the form of a drawer fitted in a carrier which slides transversely of the barm-chamber $B^x$, so that the sieve may readily be made to coincide with either of the longitudinal compartments, into which the wide bottom of the cleanser is divided. The sifting device is guided by a horizontal groove, $g$, Fig. 7, in the rear end wall of the cleanser, and a parallel rail, $r$, Fig. 6. The cleanser-bottom is divided, as aforesaid, by strips $m\,m$, primarily designed for supplementing ledges $l\,l$, corresponding with those above described, for guiding a skimmer or squeegee. This cleanser, which is supposed to be, say, twelve feet long, six feet wide, and eight inches deep, is provided with two vertical outlets, O; and L L X, Fig. 7, represent screw-legs and their cross-beam, and $w$ a window, such as those already described.

An automatic discharging device is represented at $D^x$, Figs. 6 and 7, consisting of an L-shaped pipe with a horizontal leg extending outward through a water-tight stuffing-box, and a perpendicular leg within the barm-chamber, communicating and rigidly connected with the tubular stem of a float, F, when complete, as shown in Fig. 6. Said perpendicular leg may be allowed to stand vertically, as shown in dotted lines in Fig. 7, until the surface liquid is ready to be drawn off before applying the float. When the latter is on and adjusted, it floats in the liquid and keeps the extremity of its tubular stem submerged to the proper extent for carrying off the scum. It is adjusted by small annular weights $w^x$ on a vertical pin. A preferred modification of said automatic discharging device is represented at $D^x$, Fig. 8, jointly with Fig. 9, comprising a float, $F^x$, loosely coupled to the inner extremity of an L-shaped pipe, so as to rest horizontally in the liquid, and provided with adjusting-weights $w^z$ directly over its pivotal connection with the pipe; also a vertically-slotted cap, $c^x$, Fig. 9, for said extremity of the pipe, whereby the escape into the latter may be graduated with greater nicety than in the other arrangements. Either of these automatic discharging devices may be further modified by making the horizontal outlet fixed and connecting a swinging tube thereto by a knuckle-joint or hinge, like one of those shown at $x$ in Figs. 1 and 3, and either of them may be used in the barm-cleanser first described as a substitute for its discharging device D, Figs. 1, 2, and 5.

I am aware of the self adjusting telescopic device for drawing off liquids from the surface downward set forth in German Patent No. 19,277, and hereby disclaim the same as old.

I am also aware that a discharging device having a swinging outlet-tube has been shown in bottling apparatus.

I am also aware that it is old to cool barm-liquid by means of floating ice, or ice in floating "skimmers," and that a cooling device in the form of a coil through which cold water circulates has been employed in beer-cooling tubs. Such a coil is my preferred cooling device; but in carrying out my invention any approved substitute therefor may be employed, provided the same cools the barm-liquid from its top downward, which I have found to be essential to the best results. Other forms of discharging device may likewise be employed as substitutes for those hereinbefore set forth in my general combination of parts.

Having thus described my said improvements in apparatus for washing, sifting, cooling, purifying, and storing yeast for use in brewing and for other purposes, I claim as my invention and desire to patent under this specification—

The combination, in a barm-cleanser, of a cooling device, as a vertically-adjustable coil through which cold water is circulated, for cooling the liquid mixture from its surface downward, a window or windows in the side of the cleanser to expose to view the strata formed by the precipitating barm, the refuse liquid, and the bacteria and other impurities which float in and upon the latter, and a discharging device, as an L-shaped pipe, with one member swinging on the axis of the other, for drawing off said refuse liquid with the scum thereon from its surface downward, substantially as herein specified, for the purposes set forth.

In testimony whereof I affix my signature in presence of two witnesses.

NATHANIEL BRADLEY.

Witnesses:
 JOHN G. WILSON,
 JOHN HUZE.